United States Patent [19]

Locke

[11] 3,795,768
[45] Mar. 5, 1974

[54] HOLOGRAPHIC IMAGE SCANNER/RECORDER SYSTEM

[75] Inventor: John William Locke, Don Mills, Ontario, Canada

[73] Assignee: Communication Satellite Corporation, Washington, D.C.

[22] Filed: Dec. 15, 1971

[21] Appl. No.: 208,302

[52] U.S. Cl. ................. 178/7.6, 178/6.6 R, 350/3.5
[51] Int. Cl. ............................................. H04n 1/22
[58] Field of Search ... 178/5.2 D, DIG. 28, 7.6, 7.1, 178/7.2, 5.4 CD; 350/3.5, 162 ZP

[56] References Cited

UNITED STATES PATENTS

| | | | |
|---|---|---|---|
| 1,962,474 | 6/1934 | Baird | 350/162 ZP |
| 3,619,033 | 11/1971 | McMahon | 350/3.5 |

OTHER PUBLICATIONS

Applied Optics, Vol. 6, No. 2, February 1967, pp. 317–322.

*Primary Examiner*—Robert L. Richardson
*Attorney, Agent, or Firm*—Sughrue, Rothwell, Mion, Zinn & Macpeak

[57] ABSTRACT

A holographic image recording and scanning system using a rotating reflection hologram to produce rotating reconstructed image spots. Recording is accomplished by securing a record medium about the circular path traveled by the reconstructed image spots and varying the intensity of the illuminating beam. To record color images, both the intensity and spectral content of the illuminating beam are varied with time. To provide registration between the reconstructed image spots rotating in a scanning circle and the images on the record medium, the medium is curved to correspond to the circumference of the scanning circle.

Image reproduction is accomplished by situating a record medium containing prerecorded images in registration with the scanning circle and scanning the medium with reconstructed image spots. Variations in the intensity of the beam transmitted through the record medium when the medium is transparent, or reflected from the medium when it is opaque, are detected by suitable photodetector means. When color images are to be detected, the variations in both the intensity and spectral content of either the transmitted light or the reflected light are detected.

15 Claims, 4 Drawing Figures

HOLOGRAPHIC IMAGE SCANNER/RECORDER SYSTEM

BACKGROUND OF THE INVENTION

1. Field of the Invention

The invention is in the field of image recording and scanning systems.

2. Description of the Prior Art

Various systems for image recording and scanning using laser light sources are known. These systems generally comprise a rotating optical assembly for providing the scanning spot or spots. Most of these scanning systems employ a rotating multifaceted mirror such as illustrated in U.S. Pat. No. 3,529,884. Another type of system which again uses a rotating optical assembly makes use of fiber optic bundles. Such a system is described in U.S. Pat. No. 3,240,106. Both the multifaceted mirror system and the fiber optic system are relatively expensive to produce. Further, with regard to the mirror systems, it is very difficult to mount each facet of the multifaceted mirror such that each facet is aligned to reflect light in the exact direction required. In addition, since a flat mirror can only reflect and not focus light, a lens system is normally needed to focus the light.

Realizing the problems associated with such prior image recording and scanning systems, experimenters in the field of holography have undertaken to develop image scanners which are relatively inexpensive to produce while improving upon scanner versatility by providing scanners which can readily provide a plurality of focused scanning spots in virtually any pattern. The present state of the holographic scanner art is discussed in an article entitled "Image Scanning by Rotation of a Hologram," by Ivan Cindrich, Applied Optics, September, 1967, Volume 6, No. 9, pages 1531–1534. Disclosed in this article is an image scanner utilizing a rotating transparent hologram formed from a film transparency. To create a scanning spot, a hologram of a single point object is recorded on the transparency. The hologram is then illuminated with a beam and a reconstructed focused image spot appears in space on the side of the hologram opposite the side receiving the illuminating beam. As the hologram is rotated the reconstructed image spot moves in a circular path called the scanning circle.

Cindrich teaches positioning a record medium in the plane of the scanning circle and thus the medium is scanned in a circular pattern. Since it is often desirable to provide a straight line scan, Cindrich discloses various methods for increasing the radius of the scanning circle in order to cause the portion of the scanning circle which is in registration with the record medium to approach a straight line. A basic problem with this technique is that a truly straight line scan is impossible to realize. Further, a system constructed in accordance with the Cindrich teaching for providing a scan which approaches a straight line must be relatively large since there must be a large distance between the axis of rotation of the hologram and the scanning circle.

By requiring the use of a transparent hologram, numerous problems are encountered in providing a stable rotational system for supporting and rotating the hologram. In the design of a support for a transmission hologram, it must be remembered that both surfaces of the hologram must be clear of obstructions to avoid interference with the illuminating beam and the reconstructed image spots.

In addition, systems which use transparent holograms must use photographic plates which are of a high optical quality throughout their volumes and which have essentially flat, parallel top and bottom surfaces to prevent skewing of reconstructed image spots produced by passing an illuminating beam through the plate. Production of such photographic plates is extremely difficult and quite expensive.

SUMMARY OF THE INVENTION

It is an object of this invention to provide an image scanning and recording system which uses a rotating hologram while solving the problems associated with prior hologram scanning systems.

It is a further object of the invention to provide a holographic scanner system which can record and scan both black and white and color images.

Briefly, the present invention provides a holographic scanning and recording system which includes a rotatable reflection hologram containing the interference pattern of at least one image spot beam and a reference beam. The use of a reflection hologram alleviates the problems associated with properly supporting a transparent hologram on a rotation system such that the hologram is substantially unaffected by external disturbances such as vibration. Since the use of the reflection hologram permits the illuminating beam to impinge upon the same surface of the hologram from which is projected the reconstructed image spot, the rear surface of the hologram can be rigidly supported on a support system thereby alleviating the instability problems associated with the mounting of a transparent hologram.

Further, by using a reflection hologram only the surface of the plate receiving the illuminating beam need be flat. One need not be concerned with the internal structure of the plate or the position of its bottom surface in relation to the top surface.

Further, the present system provides a simple inexpensive technique for developing registration between a straight line on the record medium and the circular path traveled by the reconstructed image spots. This technique comprises positioning the record medium perpendicular to the plane of the scanning circle and curving the record medium, which may be a transparent film or any other suitable record medium, to match the circumference of the scanning circle.

In the recording mode of operation, the intensity of the reconstructed spots, focused on the record medium, is varied as a function of time by varying the intensity of the illuminating beam. For recording color images, both the intensity and spectral content of the reconstructed image spots are varied with time.

In the scanning mode of operation, the record medium containing previously recorded images is scanned by illuminating the hologram with an illuminating beam and simultaneously rotating the hologram to cause the locus of points through which the reconstructed image spots move to define a scanning circle. When the record medium is transparent, image detection is accomplished using suitable photodetectors responsive to the intensity variations of radiation transmitted through the medium. For non-transparent record mediums, the intensity of the reflected radiation is detected. To detect color images, the variations in both the intensity and spectral content of the transmitted or reflected beam are detected.

DETAILED DESCRIPTION OF THE PREFERRED EMBODIMENTS

Figures 1, 2, 3, 4:
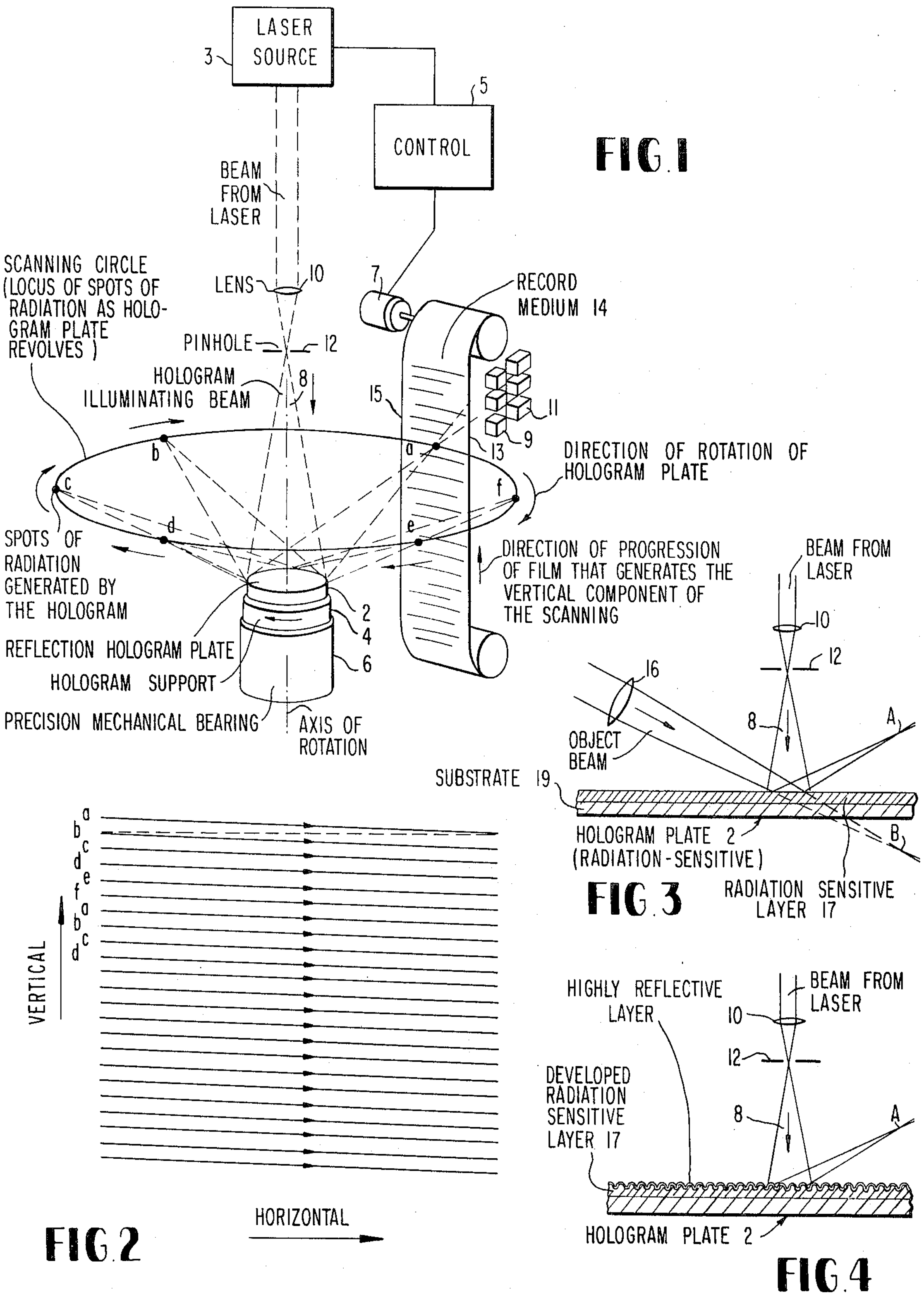
FIG. 1 is an illustration of the holographic scanning and recording system of the present invention.
FIG. 2 is a representation of one scanning pattern achieved with the system illustrated in FIG. 1.
FIG. 3 is a diagram of a technique for forming a hologram to be used with the present invention.
FIG. 4 illustrates the reconstructing of the previously recorded image spot.

The holographic scanning and recording system of the invention is illustrated in FIG. 1. A reflection hologram plate 2 is situated on a hologram support 4, with the hologram support being coupled to precision mechanical bearing 6 which causes the hologram support and the reflection hologram plate to rotate together. For the purposes of illustration only, the reflection hologram plate is assumed to contain six interference patterns spaced about the plate such that six reconstructed image spots spaced as illustrated in FIG. 1 are produced when the hologram plate is illuminated by illuminating beam 8. The interference patterns are formed such that the six reconstructed image spots are all located on the circumference of a scanning circle having a predetermined radius centered at the axis of rotation of the plate. It should be obvious to those skilled in the art that more or less reconstructed image spots may be formed by suitably recording more or less interference patterns on the hologram plate.

The illuminating beam 8 originates from laser source 3. The beam from laser source 3 is passed through lens 10 and pinhole 12 to form a diverging illuminating beam 8. A record medium 14 located along the scanning circle is curved to form an arcuate portion coincident with the circumference of the scanning circle. In this manner, the radius of the scanning circle can be made relatively small while retaining complete registration between the scanning circle and a line on the record medium.

With the record medium 14 initially assumed to be stationary, rotation of the hologram plate 2 in the presence of illuminating beam 8 causes the reconstructed image spots to scan a line across the surface of the record medium 14. In the simplest embodiment, the hologram plate may contain only a single interference pattern to thereby form a single reconstructed image spot. The record medium can be intermittently moved in a direction normal to the plane of the scanning circle, once each revolution of the hologram plate. In this manner, successive lines on the record medium can be scanned.

However, scanning speed can be substantially increased by utilizing a plurality of reconstructed image spots such as shown in FIG. 1. By a suitable choice of the number and spacing of these spots and of the speed of progression of the record medium relative to the hologram rotational rate, scanning of the reconstructed image spots across the record medium can be made to conform to a conventional television type raster pattern as illustrated in FIG. 2.

More specifically, the number and spacing of the reconstructed image spots and the speed of record medium progression relative to the hologram rotational rate can be controlled such that as the record medium continually moves under the control of a motor 7, for example, image spot *a* produces a scan line as illustrated in FIG. 2. As image spot *a* reaches the vertical edge 13 of the medium, assuming the hologram plate 2 is rotating clockwise as illustrated, image spot *b* would come in registration with the leading vertical edge 15 of the medium to thereby produce a scan line *b* illustrated in FIG. 2. Similarly, as image spot *b* completes its scan of the record medium, image spot *c* begins its scan. Similarly, spots *d*, *e*, and *f* scan the record medium to produce corresponding scan lines *d*, *e*, and *f* in FIG. 2. After image spot *f* has completed its scan, the sequence starts over again with image spot *a* producing another scan line.

Operation of the system for recording black and white and color images and for detecting previously recorded black and white and color images will now be described.

When the system is operating in its recording mode, record medium 14 may be a radiation sensitive medium such as photographic film. An illuminating beam 8 is caused to impinge the hologram plate 2 as it rotates. Black and white information can be recorded on the record medium 14 by modulating the intensity of the reconstructed image spot as it scans the medium. Modulation of the intensity of the image spot is accomplished by modulating the illuminating beam in accordance with the desired information. Illuminating beam modulation may be provided by a conventional control unit 5 which, in response to information signals, generates modulation signals to the laser source 3.

In recording black and white images, the spectral content of the illuminating beam 8 is not critical. However, as will be explained more fully below, it is desirable that the spectral content of the illuminating beam 8 contain the same wavelengths used in forming the interference pattern so that a sharp focused image spot is produced. This can easily be accomplished by using the same laser source, utilized in forming the hologram, to produce the illuminating beam.

To record color images, both the intensity and the spectral content of the illuminating beam 8 are varied with time. To assure that sharp focused image spots capable of containing all of the desired wavelengths are produced, the holograms may be formed by exposing the hologram plate to a plurality of hologram forming beams at the wavelengths desired. For example, one laser source capable of producing light corresponding, respectively, to the wavelengths of the primary colors red, green and blue may be used. The intensity of the light corresponding to each wavelength would be modulated by separate modulators similar to control 5. If an illuminating beam contains a wavelength not used in forming the hologram, the reconstructed image spot will be poorly focused due to the diffraction of the illuminating beam wavelength by those hologram components formed by exposure to other wavelengths. Further, the poorly focused spot will generally not be positioned along the circumference of the scanning circle.

When the system is used as a scanner for reproducing previously recorded images, the record medium 14 may take the form of a photographic film on which a transparent image has already been recorded and developed. The record medium may also be of opaque material such as paper. The system is operated much like it is in the recording mode of operation except that the intensity and relative spectral content of the illuminating beam are held constant. Assuming the use of a transparent film as the record medium, one or more radiation sensitive devices, such as photomultipliers, are provided behind the film to receive the transmitted radiation caused by scanning the film with the reconstructed image spots. The intensity and relative spectral content of the radiation that passes through the film, assuming color images are recorded thereon, are converted into corresponding electrical signals from these detectors. These radiation detectors may be made wavelength sensitive and, therefore, the content of the transmitted beam can be analyzed and the color information stored in a color transparency becomes available.

One relatively simple manner for detecting the color information on a color transparency is illustrated in FIG. 1. It is to be noted, however, that the method illustrated is not meant to be limiting on the invention. Any other means for detecting the spectral content of the beam passing through the film may be used.

In accordance with the technique illustrated in FIG. 1, a plurality of optical filters 9, each responsive to a different wavelength in the transmitted beam, is positioned in front of a plurality of photomultipliers 11. All of the filters simultaneously receive the transmitted light. Since the wavelength received by each photomultiplier is known, the spectral content of the transmitted beam along with the optical density, that is the relative intensity, at each wavelength can be easily determined.

An important element of the scanning and recording system of this invention is the reflection hologram. The preferred technique is a modification of a technique for producing reflection holograms disclosed by A. K. Rigler in Journal of the Optical Society of America, December, 1965, Vol 55, No. 12, page 1693.

Referring to FIG. 3, a suitable substrate 19 such as glass is provided with a radiation sensitive layer 17 such as the Kodak 649 emulsion. The substrate with the radiation sensitive surface is subjected to two beams of radiation called the object beam and the reference beam 8. Both the object beam and the reference beam are derived from the same laser source. The reference beam comes through the lens 10 and pinhole 12. In order to be able to reconstruct the image spots in a scanning circle the recording process is constrained by the following. The point source from pinhole 12 of the reference beam 8 must be, within small tolerances, exactly on the rotational axis of the hologram plate while the plane of the plate receiving the object and reference beams should be substantially flat and perpendicular to the rotational axis. The constraint on the reference beam applies equally to the illuminating beam. Thus, it becomes apparent that the reference beam is identical to the illuminating beam subsequently used to reconstruct the image spot. The object beam, rather than being reflected from an object to be recorded, as is the case in the prior art, is directed from the laser source through a suitable optical system such as lens 16 to the hologram plate to converge to a virtual object, in the form of an image spot, at position B. By ordinary Fresnel reflection, the same object beam will form a real image at A.

Applicant has determined, by experimentation, that a real image will be formed at A upon reconstruction only if a virtual object is formed at B during the making of the hologram. If the optical system is such as to cause a real image of the spot to be formed on or above the surface of the hologram plate, as is taught by A. K. Rigler in the aforementioned article, a real image will not appear at A. Instead, on reconstruction, a virtual image will appear located beneath the surface of the hologram plate receiving the illuminating beam resulting in a diverging cone of light rather than a converging cone being available above the plate.

When the object beam and the reference beam simultaneously impinge upon the radiation sensitive portion 17 of the hologram plate 2, an interference pattern is formed which consists of relatively high radiation intensity where the two beams are in phase and low intensity where the two beams are of opposing phase thus partially canceling each other. This pattern is recorded on the surface of the plate. When developed, the plate will have a surface relief pattern similar to a diffraction grating. That is, the surface of the radiation sensitive layer 17 will have a pattern of varying thickness as shown in FIG. 4. This pattern corresponds closely to the pattern of varying intensity of the interference pattern. In order to increase the reflectivity of the surface of the hologram plate, the radiation sensitive layer is preferably covered with a highly reflective substance such as aluminum. When the hologram is illuminated by an illuminating beam of the same wavelength as the reference beam, a beam of radiation of the same form as the Fresnel reflected object beam observed in the recording arrangement appears as illustrated in FIG. 4. That is, a real image appears at A.

To produce a hologram which when illuminated by an illuminating beam produces a multi-wavelength reconstructed image spot, a selected location on the radiation sensitive portion 17 of the hologram plate 2 is repeatedly exposed to an object beam and a reference beam, the wavelength of these beams being changed for each exposure.

Since the mechanism by which a hologram focuses radiation is diffraction, a hologram made at one wavelength will generate image spots at different locations depending directly upon the wavelength of the illuminating beam. Furthermore, a sharp spot is observed only when the illuminating beam is of a wavelength corresponding to that of the reference and object beam used during the formation of the hologram. With a multi-wavelength exposed hologram, a sharp reconstructed image spot containing all of the wavelengths of the illuminating beam can be produced at A by forming the hologram with the same wavelengths present in the illuminating beam.

It should be noted that in addition to the sharply focused image spot positioned at A, a plurality of poorly focused spots are also realized when an illuminating beam strikes a developed multi-wavelength hologram. These spots are due to the diffraction of a given wavelength by those hologram components formed by exposure to other wavelengths. However, these poorly focused spots are generally well separated from point A and thus can be removed by simple mechanical masking techniques.

While the invention has been particularly shown and described with reference to preferred embodiments thereof, it will be understood by those skilled in the art that various changes in form and details may be made therein without departing from the spirit and scope of the invention.

What is claimed is:

1. An image scanning and recording system comprising;

a. a reflection hologram for holographically generating an image spot, b. means for rotating said image spot generating means to cause the image spot to scan a locus of points defining a scanning circle and c. a record medium, parallel to the axis of rotation of said image spot generating means, and curved to form an arc having a radius centered at said axis of rotation, said arc radius being of the same length as the radius of the scanning circle.

2. The system of claim 1 wherein said means for holographically generating further comprises an illuminating beam directed onto the surface of said reflection hologram.

3. The system of claim 2 wherein said record medium is radiation sensitive, further including means for varying the intensity of the illuminating beam and means for moving said record medium in a direction perpendicular to the plane of said scanning circle.

4. The system of claim 3 wherein said record medium is color sensitive film, further including means for varying the spectral content of said illuminating beam.

5. The system of claim 2 wherein said record medium contains prerecorded images, further including radiation sensitive detector means, responsive to radiation from the record medium, produced in response to the image spot, for generating electrical signals proportional to the intensity of radiation from the record medium.

6. The system of claim 5 wherein said radiation sensitive detector means include means for discriminating the wavelengths of the radiation from said recording medium.

7. An image scanning and recording system comprising;

a. a reflection hologram plate having an interference pattern corresponding to an image spot developed thereon.

b. means, operating on said hologram plate for reconstructing the image spot in space, c. meansfor rotating said hologram plate to cause the reconstructed image spot to travel about the circumference of a circle centered about the axis of rotation of said hologram plate and d. a record medium positioned to be intersected by said image spot.

8. The system of claim 7 wherein said record medium is positioned parallel to said axis of rotation and is curved to form an arc having a radius centered at said axis and of a length equal to the length of the radius of said circle.

9. The system of claim 7 wherein said means for reconstructing said image spot comprises means for illuminating said hologram plate with an illuminating beam.

10. The system of claim 9 wherein said record medium is radiation sensitive, further including means for varying the intensity of the illuminating beam and means for moving said record medium in a direction perpendicular to the plane of said scanning circle.

11. The system of claim 10 wherein said record medium is color sensitive film, further including means for varying the spectral content of said illuminating beam.

12. The system of claim 9 wherein said record medium contains prerecorded images, further including radiation sensitive detector means, responsive to radiation from the record medium, produced in response to the image spot, for generating electrical signals proportional to the intensity of radiation from the record medium.

13. The system of claim 12 wherein said radiation sensitive detector means include means for discriminating the wavelengths of the radiation from said recording medium.

14. An image scanning and recording system comprising:

a. means for holographically generating an image spot, b. means for rotating said image spot generating means to cause the image spot to scan a locus of points defining a scanning circle and c. a record medium, parallel to the axis of rotation of said image spot generating means, and curved to form an arc having a radius centered at said axis of rotation, said arc radius being of the same length as the radius of the scanning circle.

15. The image scanning and recording system of claim 14, further comprising means for causing said record member to move in a direction normal to the plane of the scanning circle to thereby scan successive lines on the recording medium.

* * * * *